(12) United States Patent
Mielenhausen (10) Patent No.: US 10,503,706 B2
(45) Date of Patent: Dec. 10, 2019

(54) DEFERRED DATA DEFINITION STATEMENTS

(71) Applicant: SAP SE, Walldorf (DE)

(72) Inventor: Bjoern Mielenhausen, Plankstadt (DE)

(73) Assignee: SAP SE, Walldorf (DE)

( * ) Notice: Subject to any disclaimer, the term of this patent is extended or adjusted under 35 U.S.C. 154(b) by 732 days.

(21) Appl. No.: 14/727,184

(22) Filed: Jun. 1, 2015

(65) Prior Publication Data

US 2016/0350337 A1 Dec. 1, 2016

(51) Int. Cl.
*G06F 16/21* (2019.01)

(52) U.S. Cl.
CPC .................. *G06F 16/211* (2019.01)

(58) Field of Classification Search
CPC .................. G06F 17/30292; G06F 16/211
USPC .......................................... 707/803
See application file for complete search history.

(56) References Cited

U.S. PATENT DOCUMENTS

| 5,742,806 | A * | 4/1998 | Reiner | G06F 16/24532 |
| 6,775,676 | B1 * | 8/2004 | Briam | G06F 17/30595 |
| 7,668,818 | B2 * | 2/2010 | Hou | G06F 16/2452 |
|  |  |  |  | 707/760 |
| 7,720,874 | B2 * | 5/2010 | Barsness | G06F 17/30312 |
|  |  |  |  | 707/802 |
| 8,386,532 | B2 * | 2/2013 | Annapragada | G06F 17/30545 |
|  |  |  |  | 707/609 |
| 2007/0244865 | A1 * | 10/2007 | Gordon | G06F 17/3056 |
| 2009/0157765 | A1 * | 6/2009 | Anderson | G06F 11/1469 |
| 2009/0234801 | A1 * | 9/2009 | Moor | G06F 8/437 |
| 2010/0017395 | A1 * | 1/2010 | Wayn | G06F 16/283 |
|  |  |  |  | 707/E17.014 |
| 2010/0125565 | A1 * | 5/2010 | Burger | G06F 16/24542 |
|  |  |  |  | 707/713 |
| 2011/0119288 | A1 * | 5/2011 | Sinha | G06F 17/30306 |
|  |  |  |  | 707/769 |
| 2011/0320474 | A1 * | 12/2011 | Chainani | G06F 17/30356 |
|  |  |  |  | 707/769 |
| 2012/0136904 | A1 * | 5/2012 | Venkata Naga Ravi |  |
|  |  |  |  | G06F 17/30289 |
|  |  |  |  | 707/803 |
| 2014/0143284 | A1 * | 5/2014 | McCaffrey | G06F 17/30297 |
|  |  |  |  | 707/803 |
| 2014/0164422 | A1 * | 6/2014 | Diaz | G06F 17/30427 |
|  |  |  |  | 707/760 |
| 2015/0074069 | A1 * | 3/2015 | Baeuerle | G06F 8/35 |
|  |  |  |  | 707/702 |

(Continued)

*Primary Examiner* — James Trujillo
*Assistant Examiner* — Jessica N Le
(74) *Attorney, Agent, or Firm* — Schwegman Lundberg & Woessner, P.A.

(57) ABSTRACT

Example embodiments involve a system, computer-readable storage medium storing at least one program, and computer-implemented method for processing deferred clauses used in conjunction with data definition statements. The method may include receiving a data definition statement signaling creation of a database object. The received data definition statement specifies a dependency of the database object on a non-existing database object. The method may further include determining whether a deferred clause is included in the data definition statement; and based on determining that the deferred clause is included in the data definition statement, creating the database object with the dependency on the non-existing database object.

14 Claims, 7 Drawing Sheets

(56) References Cited

U.S. PATENT DOCUMENTS

2015/0081745 A1\* 3/2015 Kozin ............... G06F 17/30292
                                                                    707/803
2016/0342628 A1\* 11/2016 Van Rest ............... G06F 16/835
2016/0342646 A1\* 11/2016 Baranczyk ............ G06F 16/248

\* cited by examiner

DEFERRED DATA DEFINITION STATEMENTS

TECHNICAL FIELD

Example embodiments of the present application generally relate to data processing and, more particularly, to database management techniques.

BACKGROUND

Database query languages are computer-readable languages used in querying, updating, and managing relational databases. In database query languages such as standard query language (SQL), objects may depend on tables and other objects stored in the database. For example, an SQL view object may depend on a data table. Usually a database management system (DBMS) allows for an object to be changed independently of its existing dependent objects (e.g., via alter, drop, create, or replace statements). However, while modifying objects in the database may be a simple undertaking, the initial creation of objects may present several challenges because of the complexity of orchestrating all object creation statements in an appropriate order (e.g., an object can only be created successfully once all underlying objects and tables have been created).

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As an example of the aforementioned challenges in the orchestration of database object creation, consider three possible states of an object in a database: 1) non-existing; 2) valid; and 3) invalid. Further, assume V denotes an object and req(V) denotes the set of objects V depends on. When V is in a non-existing state, a data definition statement such as a create statement (e.g., in SQL) may be used to transition V to the valid state. While in the valid state, an alter statement may be used to modify V, which does not result in a state change, or a drop statement may be used to delete V, and return it to the non-existing state. Further, while in the valid state, changes (e.g., deleting or modifying) to req(V) may result in the transition of V to the invalid state.

While V is in the invalid state, meaning that V cannot be compiled, an alter statement may be used to transition V to the valid state, or a drop statement may be used to delete V and return it to the non-existing state. However, traditionally it is not possible to create an invalid object directly. In other words, under conventional practice, an object must be created validly before it may be invalidated by changing other objects the object depends on.

Aspects of the present disclosure seek to address the above referenced challenges related to database management, among others, by providing a variant to certain conventional data definition statements. In particular, example embodiments involve use and processing of deferred clauses in conjunction with data definition statements. Use of a deferred clause in conjunction with a data definition statement allows for creation of an invalid database object (e.g., a database object that cannot be compiled), though, the use of deferred clauses may not necessarily lead to the creation of an invalid state database object in every instance. For purposes of the present disclosure, the terms "data definition statement," and "statement" may be used synonymously to refer to an executable element within a database query language that expresses an action to be carried out with respect to a database object (e.g., a data object residing on a database). As an example, SQL includes a data definition language (DDL) that includes CREATE, ALTER, DROP, and REPLACE statements, each of which are examples of data definition statements.

An example use of the deferred clause is discussed below by reference to FIG. 1, which is a state diagram illustrating various states of a database object and various statements used to transition the object between states, consistent with some embodiments. Although FIG. 1 illustrates data definition statements (e.g., CREATE, DROP, and ALTER) that are provided as part of a particular programming language, namely SQL, it shall be appreciated that the subject matter of the present disclosure is not intended to be limited to SQL and may be find equal application in other programming languages.

Figure 1:
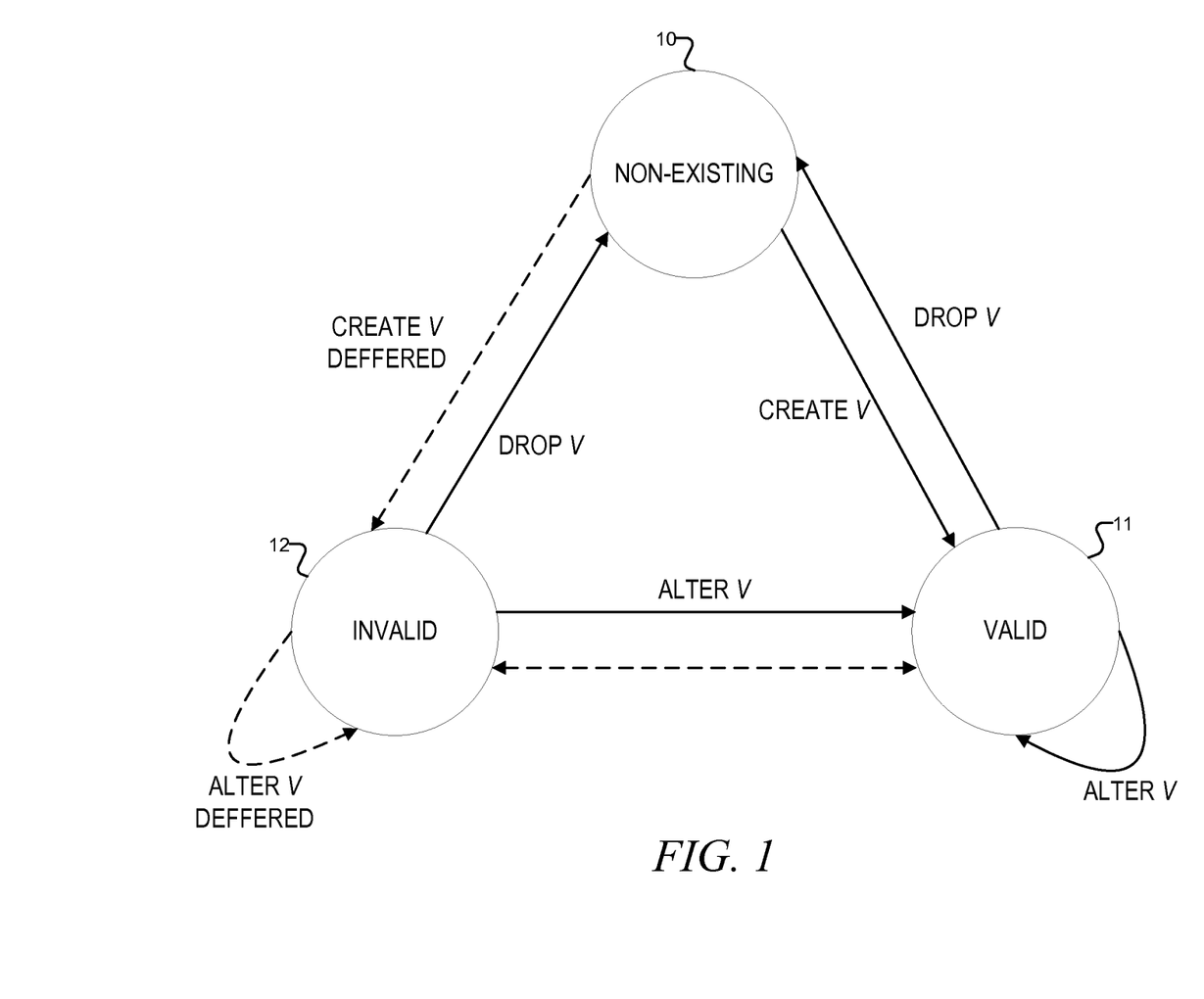
FIG. 1 is a state diagram illustrating various states of a database object and various statements used to transition the database object between states, consistent with some embodiments.

In FIG. 1 and as discussed above, V is used to denote a database object and req(V) is used to denote the set of database objects V depends on. As illustrated in FIG. 1, the object V may occur in one of three states: state 10, in which V is non-existing; state 11, in which the V exists in a valid state; and state 12, in which V exists in an invalid state. In the example illustrated in FIG. 1, the object V, when in state 12, is invalid because the set of objects, req(V), from which V depends, does not exist.

As with the conventional practice discussed above, FIG. 1 illustrates that V may be transitioned from state 10 to state 11 (e.g., non-existing to valid) via a create statement, and a drop statement may be used to delete V and thereby return it to non-existence in state 10. An alter statement may be used to modify V while in state 11, which does not result in a change to the validity of V. Further, while in state 12, an alter statement may be used to transition V to state 11 (e.g., a valid state), or a drop statement may be used to delete V and return it to state 10 (e.g., a non-existing state).

In contrast to the conventional practice, FIG. 1 illustrates that the object V may be transitioned from the non-existing state 10 through use of a deferred clause in conjunction with a create statement. In other words, the deferred statement allows the object V to be created even if req(V) does not exist. Additionally, a deferred clause used in conjunction with an alter statement may be employed to modify V though it may be in an invalid state (e.g., state 120)

The use of a deferred statement in a data definition statement signals to the DBMS that the object may not be able to be activated validly, for example, because an object needs to be created before a table underlying the object. Upon detecting the deferred clause, the DBMS validates the syntax of the statement and executes the action expressed by the statement (e.g., creates a new object or modifies an existing object) without applying any semantic checks. In this manner, the order of certain data definition statements, such as create and alter statements, may be changed arbitrarily. Further, use of deferred statements allows for parallel processing of data definition statements without any interference, which improves lifecycle management of database objects.

Figure 2:
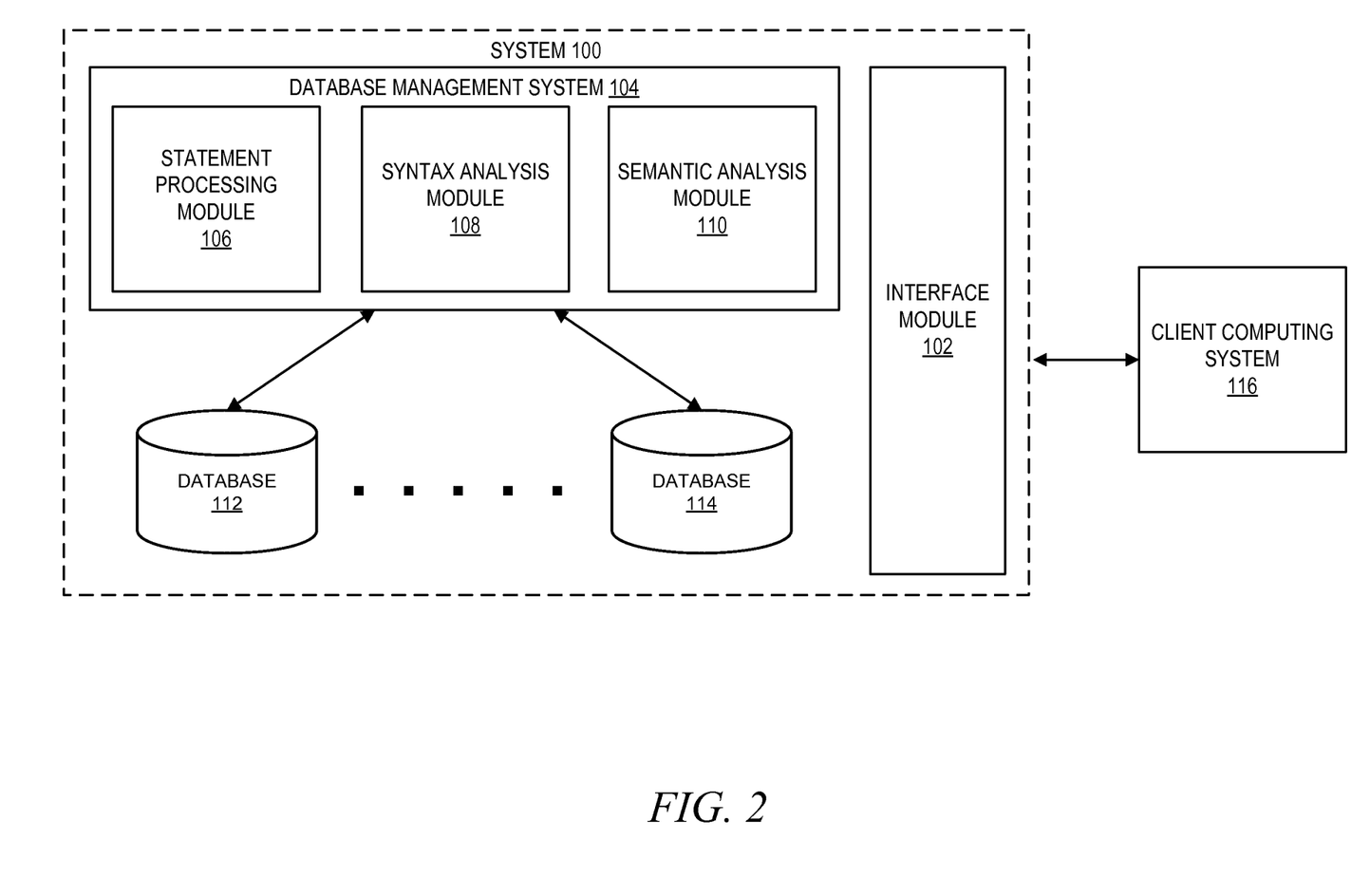
FIG. 2 is a block diagram illustrating a system, according to an example embodiment.

FIG. 2 is a block diagram illustrating a system 100, according to an example embodiment. As is understood by skilled artisans in the relevant computer and Internet-related arts, each component (e.g., a module or engine) illustrated in FIG. 2 represents a set of executable software instructions and the corresponding hardware (e.g., memory and processor) for executing the instructions. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the system 100 to facilitate additional functionality that is not specifically described herein. Moreover, it shall be appreciated that although the various functional components included in the system 100 are discussed in the singular sense, multiple instances of one or more of the various functional components may be employed.

As shown, the system 100 includes an interface module 102, and a database management system (DBMS) 104 comprising a statement processing module 106, a syntax analysis module 108, and a semantic analysis module 110, all configured to communicate with each other (e.g., via a bus, shared memory, a switch, or application programming interfaces (APIs)). The various functional components of the system 100 may reside on a single computer (e.g., a server), or may be distributed across several computers in various arrangements.

The interface module 102 provides interfaces such as a graphical user interface (GUI) or application programming interface (API) that may be used to receive user commands and data. The DBMS 104 generally is a software subsystem for storing, retrieving, and manipulating information (e.g., database objects) stored in database tables of databases 112-114. Under the command of DBMS 104, user commands and data submitted by a client computing system 116 are received through the interface module 102. User interfaces provided by the interface module 102 may include a built-in query surface or editor for accessing and processing database information.

The statement processing module 106 is responsible for receiving and processing data definition statements, which includes executing the actions expressed in the data definition statements. The syntax analysis module 108 is responsible for performing syntactic analysis on data definition statements to verify that the structure and content of the statements is proper. The semantic analysis module 110 is responsible for performing semantic analysis of data definition statements to validate the relationships between objects involved in the statements.

Figure 3:
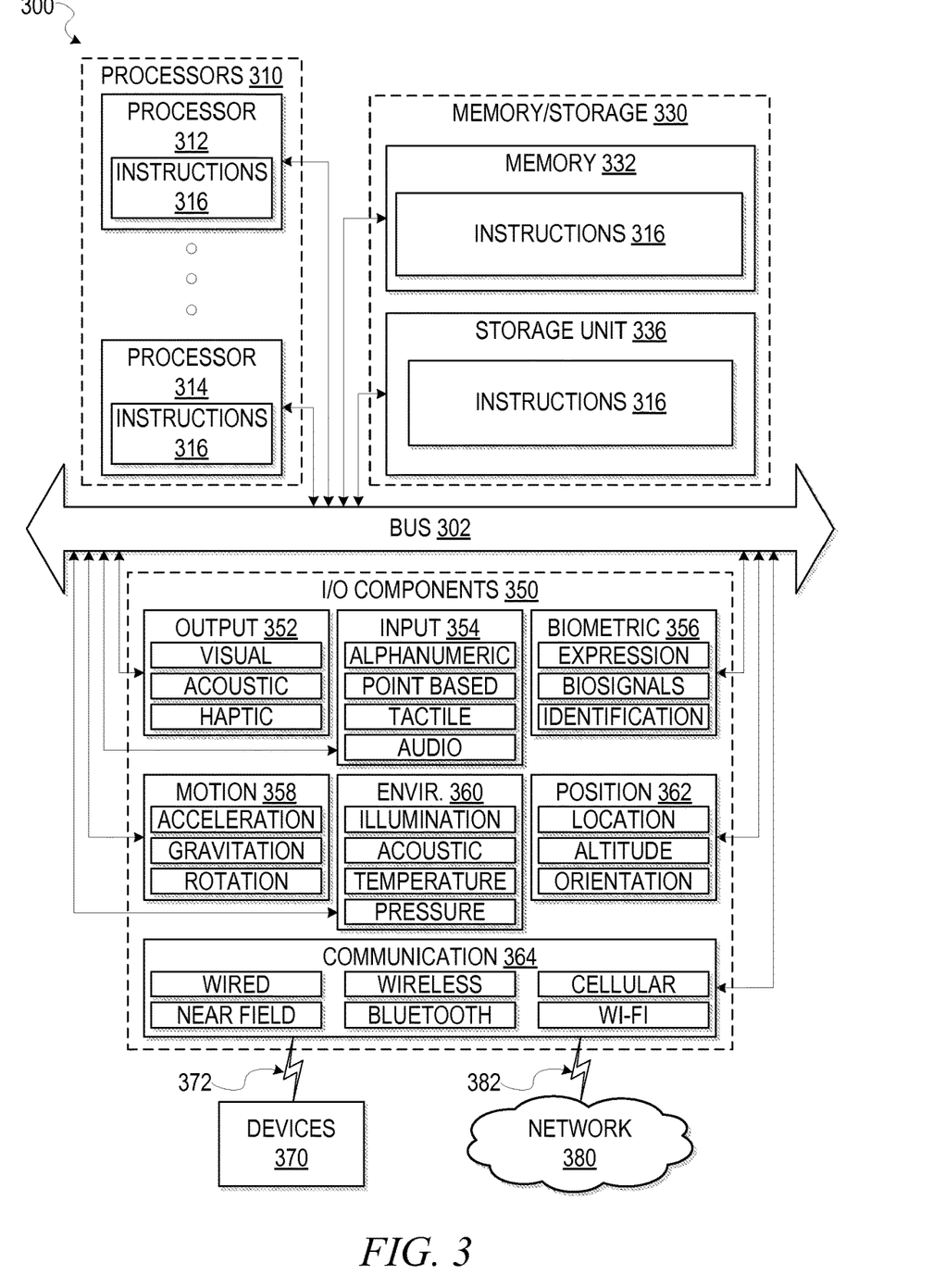
FIG. 3 is a is a diagrammatic representation of a machine in the example form of a computer system within which a set of instructions for causing the machine to perform any one or more of the methodologies discussed herein may be executed.

FIG. 3 is a block diagram illustrating components of a machine 300, according to some example embodiments, able to read instructions from a machine-readable medium (e.g., a machine-readable storage medium) and perform any one or more of the methodologies discussed herein. Specifically, FIG. 3 shows a diagrammatic representation of the machine 300 in the example form of a computer system, within which instructions 316 (e.g., software, a program, an application, an applet, an app, or other executable code) for causing the machine 300 to perform any one or more of the methodologies discussed herein may be executed. For example, these instructions transform the general, non-programmed machine into a particular machine programmed to carry out the described and illustrated functions of the system 100 in the manner described herein. The machine 300 may operate as a standalone device or may be coupled (e.g., networked) to other machines. In a networked deployment, the machine 300 may operate in the capacity of a server machine or a client machine in a server-client network environment, or as a peer machine in a peer-to-peer (or distributed) network environment. By way of non-limiting example, the machine 300 may comprise or correspond to a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 316, sequentially or otherwise, that specify actions to be taken by machine 300. Further, while only a single machine 300 is illustrated, the term "machine" shall also be taken to include a collection of machines 300 that individually or jointly execute the instructions 316 to perform any one or more of the methodologies discussed herein.

The machine 300 may include processors 310, memory 330, and input/output (I/O) components 350, which may be configured to communicate with each other such as via a bus 302. In an example embodiment, the processors 310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 312 and processor 314 that may execute instructions 316. The term "processor" is intended to include multi-core processor that may comprise two or more independent processors (sometimes referred to as "cores") that may execute instructions contemporaneously. Although FIG. 3 shows multiple processors, the machine 300 may include a single processor with a single core, a single processor with multiple cores (e.g., a multi-core process), multiple processors with a single core, multiple processors with multiples cores, or any combination thereof.

The memory/storage 330 may include a memory 332, such as a main memory, or other memory storage, and a storage unit 336, both accessible to the processors 310 such as via the bus 302. The storage unit 336 and memory 332 store the instructions 316 embodying any one or more of the methodologies or functions described herein. The instructions 316 may also reside, completely or partially, within the memory 332, within the storage unit 336, within at least one of the processors 310 (e.g., within the processor's cache memory), or any suitable combination thereof, during execution thereof by the machine 300. Accordingly, the memory 332, the storage unit 336, and the memory of processors 310 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 316. The term "machine-readable medium" shall also be taken to include any medium, or combination of multiple media, that is capable of storing instructions (e.g., instructions 316) for execution by a machine (e.g., machine 300), such that the instructions, when executed by one or more processors of the machine 300 (e.g., processors 310), cause the machine 300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 350 may include a wide variety of components to receive input, provide output, produce output, transmit information, exchange information, capture measurements, and so on. The specific I/O components 350 that are included in a particular machine will depend on the type of machine. For example, portable machines such as mobile phones will likely include a touch input device or other such input mechanisms, while a headless server machine will likely not include such a touch input device. It will be appreciated that the I/O components 350 may include many other components that are not shown in FIG. 3. The I/O components 350 are grouped according to functionality merely for simplifying the following discussion and the grouping is in no way limiting. In various example embodiments, the I/O components 350 may include output components 352 and input components 354. The output components 352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 354 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 350 may include biometric components 356, motion components 358, environmental components 360, or position components 362, among a wide array of other components. For example, the biometric components 356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 358 may include acceleration sensor components (e.g., accelerometer), gravitation sensor components, rotation sensor components (e.g., gyroscope), and so forth. The environmental components 360 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 362 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 350 may include communication components 364 operable to couple the machine 300 to a network 380 or devices 370 via coupling 382 and coupling 372, respectively. For example, the communication components 364 may include a network interface component or other suitable device to interface with the network 380. In further examples, communication components 364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 370 may be another machine or any of a wide variety of peripheral devices (e.g., a peripheral device coupled via a Universal Serial Bus (USB)).

Moreover, the communication components 364 may detect identifiers or include components operable to detect identifiers. For example, the communication components 364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 364, such as, location via Internet Protocol (IP) geo-location, location via Wi-Fi® signal triangulation, location via detecting a NFC beacon signal that may indicate a particular location, and so forth.

In various example embodiments, one or more portions of the network 380 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 380 or a portion of the network 380 may include a wireless or cellular network and the coupling 382 may be a Code Division Multiple Access (CDMA) connection, a Global System for Mobile communications (GSM) connection, or other type of cellular or wireless coupling. In this example, the coupling 382 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 316 may be transmitted or received over the network 380 using a transmission medium via a network interface device (e.g., a network interface component included in the communication components 364) and utilizing any one of a number of well-known transfer protocols (e.g., Hypertext Transfer Protocol (HTTP)). Similarly, the instructions 316 may be transmitted or received using a transmission medium via the coupling 372 (e.g., a peer-to-peer coupling) to devices 370. The term "transmission medium" shall be taken to include any intangible medium that is capable of storing, encoding, or carrying instructions 316 for execution by the machine 300, and includes digital or analog communications signals or other intangible medium to facilitate communication of such software.

Figure 4:
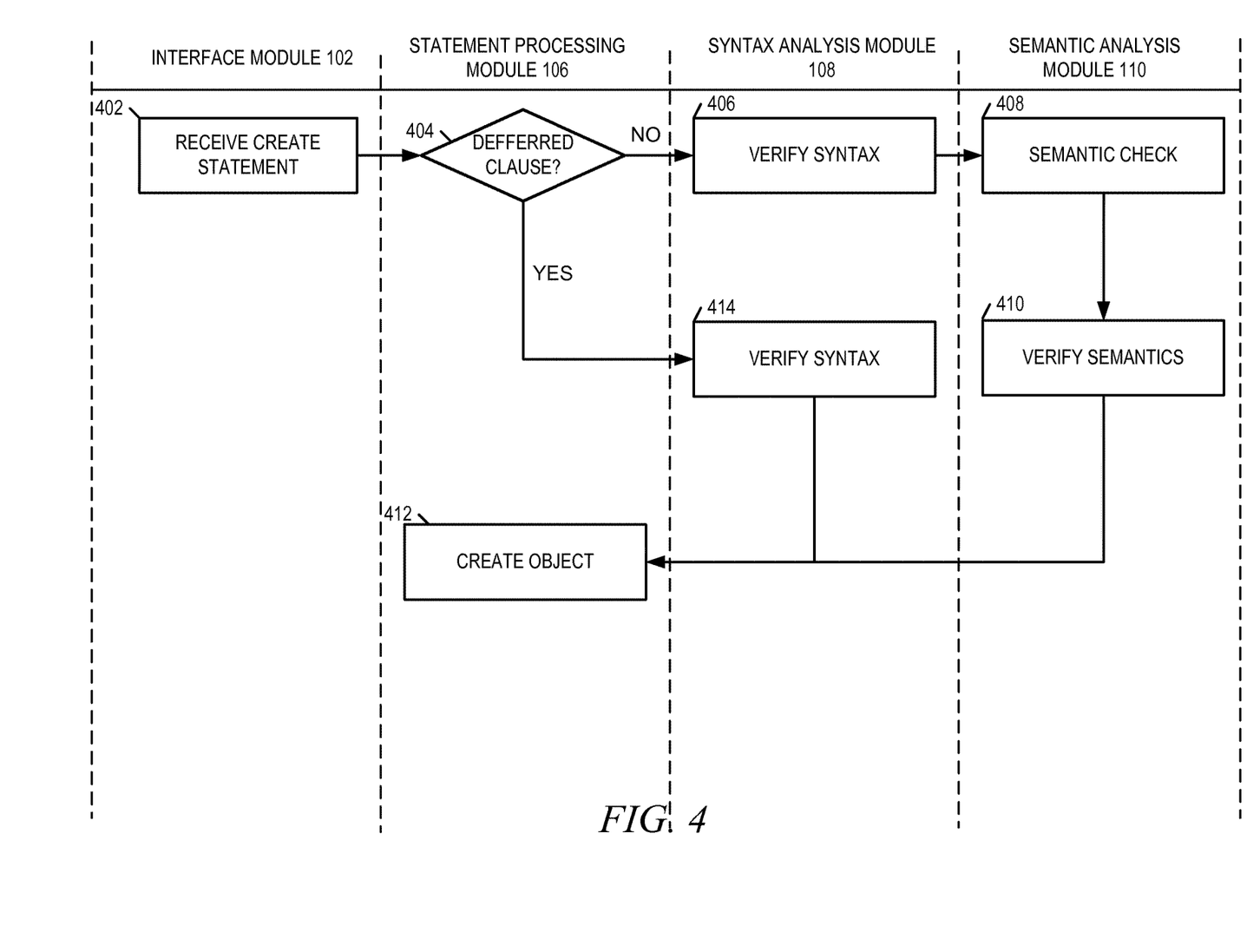
FIGS. 4 and 5 are interaction diagrams that illustrate interactions between various functional components of the system, according to an example embodiment.
Figure 5:
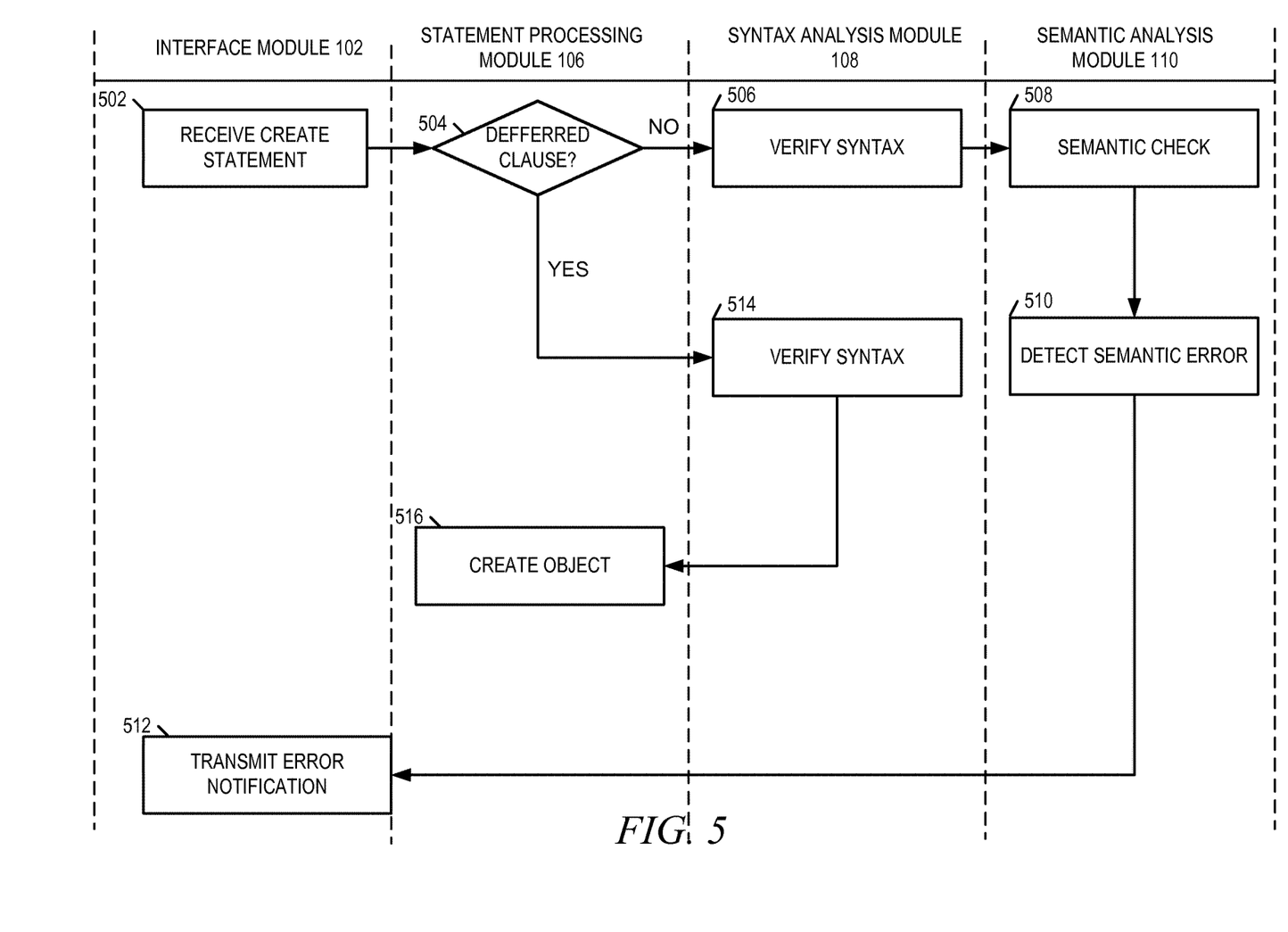

FIGS. 4 and 5 are interaction diagrams that illustrate interactions between the various functional components of the system 100, according to an example embodiment. FIG. 4, in particular, illustrates example interactions that occur between the interface module 102, the statement processing module 106, the syntax analysis module 108, and the semantic analysis module 110 upon receiving a data definition statement for a database object with dependencies on existing database objects. As shown, the process begins at operation 402 with the interface module 102 receiving a data definition statement (e.g., a CREATE statement in SQL) to signal creation of a database object (e.g., a view object) that is dependent on an existing database objects (e.g., data table). The data definition statement may, for example, be received from the client computing system 116.

At operation 404, the statement processing module 106 parses the data definition statement to determine whether a deferred clause is included in the statement. If the statement processing module 106 determines a deferred statement is not included in the data definition statement, the syntax analysis module 108 performs a syntax check on the data definition statement to verify the syntax of the statement at operation 406, and at operation 408, the semantic analysis module 110 performs a semantic analysis to verify the semantics of the statement. Once the syntax and semantics of the statement have been verified, at operation 410, the statement processing module 106 creates the database object, at operation 412, in accordance with the data definition statement (e.g., a database object dependent upon the existing database object).

If, at operation 404, the statement processing module 106 determines that a deferred clause is included in the database definition statement, the syntax analysis module 108 performs a syntax check to verify the syntax of the statement at operation 414. Once the syntax has been verified by the syntax analysis module 108, the statement processing module 106 creates the database object, at operation 412, without the semantic analysis module 110 having performed semantic checks on the statement. In other words, when the statement processing module 106 detects a deferred clause in a data definition statement, the semantic analysis operation is omitted from the database object creation process. By omitting semantic checks from the process, database objects (e.g., view objects) with dependencies on other database objects (e.g., data tables) may be created regardless of whether the other database objects actually exist.

As an example, FIG. 5 illustrates example interactions that occur between the interface module 102, the statement processing module 106, the syntax analysis module 108, and the semantic analysis module 110 upon receiving a data definition statement signaling creation of a database object with dependencies on a non-existing database object. As shown, the process begins at operation 502 with the interface module 102 receiving a data definition statement (e.g., a CREATE statement in SQL) to signal creation of a database object (e.g., a view object) that is dependent on a non-existing database objects (e.g., a data table).

At operation 504, the statement processing module 106 parses the data definition statement to determine whether a deferred clause is included in the statement. If the statement processing module 106 determines a deferred statement is not included in the data definition statement, the syntax analysis module 108 performs a syntax check on the data definition statement to verify the syntax of the statement at operation 506, and at operation 508, the semantic analysis module 110 performs a semantic analysis on the statement. Because the database object is to depend on a non-existing database object, the semantic analysis module 110 detects a semantic error with the data definition statement at operation 510. In response to the semantic analysis module 110 detecting the semantic error, the interface module 102 transmits an error notification to the computing system from which the statement was received (e.g., the client computing system 116). Accordingly, it shall be appreciated that the DBMS 104 does not support the creation of a database object that depends on non-existing database objects (e.g., an invalid state database object) in response to receipt of data definition statement that does not include a deferred clause.

If, at operation 504, the statement processing module 106 determines that a deferred clause is included in the database definition statement, the syntax analysis module 108 performs a syntax check to verify the syntax of the statement at operation 514. Once the syntax has been verified by the syntax analysis module 108, the statement processing module 106 creates the database object, at operation 516, without the semantic analysis module 110 having performed semantic checks on the statement. Thus, by preventing the semantic analysis from being performed, the deferred clause allows for the creation of a database object with dependencies on non-existing database objects. In other words, the deferred clause allows for the creation of invalid state database objects.

Figure 6:
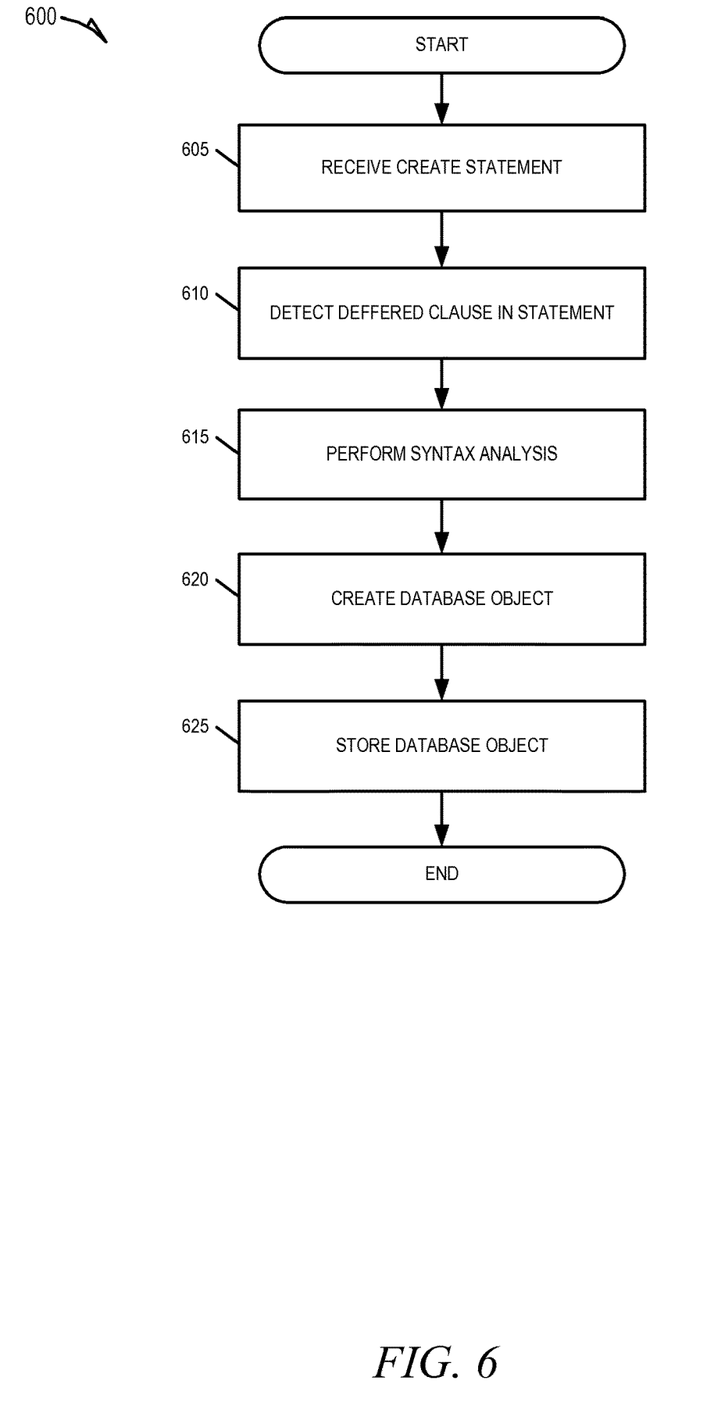
FIG. 6 is a flow chart illustrating a method for creating a database object with dependencies on a non-existing database object, according to an example embodiment.

FIG. 6 is a flow chart illustrating a method 600 for creating a database object with dependencies on a non-existing database object, according to an example embodiment. The method 600 may be embodied in computer-readable instructions for execution by one or more processors such that the steps of the method 600 may be performed in part or in whole by the components of the DBMS 104; accordingly, the method 600 is described below, by way of example with reference thereto. However, it shall be appreciated that the method 600 may be deployed on various other hardware configurations and is not intended to be limited to the DBMS 104.

At operation 605, the interface module 102 receives a data definition statement (e.g., from the client computing system 116) that includes a deferred clause and signals creation of a database object with dependencies on other non-existing database objects. For example, the interface module 102 may receive a SQL CREATE statement to create a view object that is dependent on a non-existing data table. At operation 610, the statement processing module 106 detects the deferred clause in the data definition statement.

At operation 615, the syntax analysis module 108 performs a syntax analysis to determine whether the syntax of the data definition statement is correct. The validity of the syntax, of course, depends on the specific programming language being utilized. Based on the deferred clause being detected in the data definition statement, a semantic analysis is not performed. In response to the syntax of the data definition statement being validated and without performing a semantic analysis, the statement processing module 106 creates, at operation 620, the database object in accordance with the data definition statement—that is to say, the statement processing module 106 creates the database object with a dependency on the non-existing database object. In this way, the DBMS 104 may create a database object regardless of whether the object is valid (e.g., dependent on an existing database object) or invalid (e.g., dependent on a non-existing database object), and without performing a semantic analysis of the statement.

At operation 625, the statement processing module 106 stores the database object in one of the databases 112-114. A plurality of other database objects may be stored in the databases 112-114, though, it shall be appreciated that because the database object on which the stored database object depends is non-existing, the non-existing database object is not included in the databases 112-114.

Figure 7:
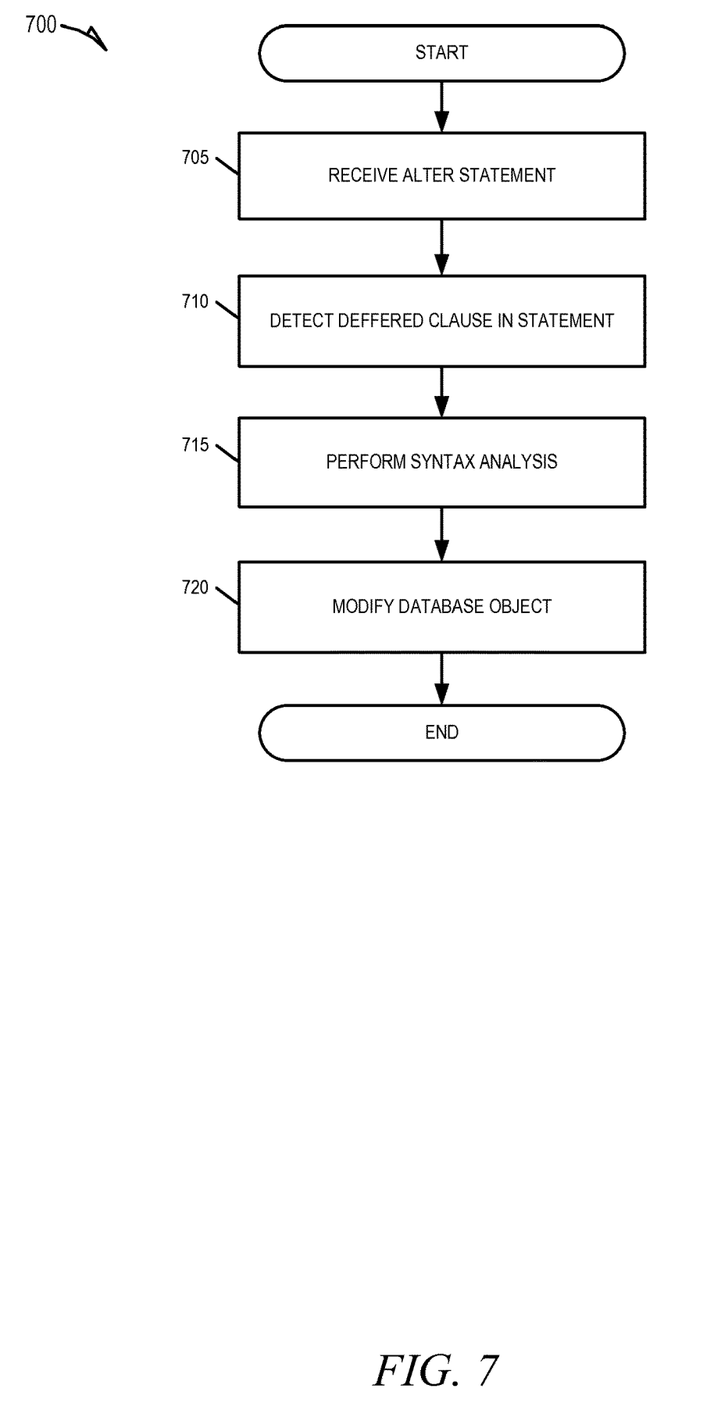
FIG. 7 is a flow chart illustrating a method for modifying a database object with dependencies on a non-existing database object, according to an example embodiment.

It shall be appreciated that the deferred clause is not limited for use with data definition statements that signal the creation of database objects such as SQL CREATE statements, and the deferred clause may also be used in conjunction with other types of data definition statements such as those that signal the modification of a database object such as SQL alter statements. For example, FIG. 7 is a flow chart illustrating a method 700 for modifying a database object with dependencies on a non-existing database object, according to an example embodiment. The method 700 may be embodied in computer-readable instructions for execution by one or more processors such that the steps of the method 600 may be performed in part or in whole by the components of the DBMS 104; accordingly, the method 700 is described below by way of example with reference thereto. However, it shall be appreciated that the method 700 may be deployed on various other hardware configurations and is not intended to be limited to the DBMS 104.

At operation 705, the interface module 102 receives a data definition statement (e.g., from the client computing system 116) that includes a deferred clause and signals modification of a database object with dependencies on other non-existing database objects. For example, the interface module 102 may receive a SQL ALTER statement to modify a view object that is dependent on a non-existing data table. At operation 710, the statement processing module 106 detects the deferred clause in the data definition statement.

At operation 715, the syntax analysis module 108 performs a syntax analysis to determine whether the syntax of the data definition statement is correct. The validity of the syntax, of course, depends on the specific programming language being utilized. Based on the deferred clause being detected in the data definition statement, a semantic analysis is not performed. In response to the syntax of the data definition statement being validated and without performing a semantic analysis, the statement processing module 106 modifies, at operation 720, the database object in accordance with the data definition statement. In this way, the DBMS 104 may modify a database object regardless of whether the object is valid (e.g., dependent on an existing database object) or invalid (e.g., dependent on a non-existing database object), and regardless of whether the modification would render the otherwise invalid object valid.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice.

Language

Although the present inventive subject matter has been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
   an interface, implemented by one or more hardware processors, configured to receive a first data definition statement signaling creation of a first database object, the first data definition statement specifying a dependency of the first database object on a non-existing second database object, the first data definition statement including a first deferred clause that allows creation of the first database object with a dependency on the non-existing second database object by preventing a semantic analysis from being performed on the first data definition statement, the semantic analysis including validating a relationship between the first database object and the non-existing second database object; and
   a statement processor, implemented by one or more hardware processors, configured to:
      detect the first deferred clause in the first data definition statement, the statement processor further to create the first database object with the dependency on the non-existing second database object based on the first data definition statement, the statement processor to prevent the semantic analysis from being performed on the first data definition statement in response to detecting the first deferred clause in the first data definition statement;
      receive a second data definition statement signaling modification of the first database object with the dependency on the non-existing second database object, the second data definition statement including a second deferred clause; and
      modify the first database object in accordance with the second data definition statement without performing a semantic analysis of the first data definition statement based on the second deferred clause being included in the second data definition statement.

2. The system of claim 1, wherein the statement processor is to create the first database object to be initially in an invalid state.

3. The system of claim 1, further comprising a syntax analyzer to perform a syntax analysis on the first data definition statement to validate the syntax of the first data definition statement prior to the first database object being created.

4. The system of claim 1, wherein the first data definition statement is a data definition language (DDL) statement.

5. The system of claim 1, wherein the first database object is initially in an invalid state, and wherein the modifying of the first database object results in the first database object remaining in the invalid state.

6. The system of claim 1, wherein the statement processor is further to store the first database object in a database, and wherein the non-existing second database object is not included in the database.

7. A method comprising:
   receiving a first data definition statement signaling creation of a first database object, the first data definition statement specifying a dependency of the first database object on a non-existing second database object;
   determining whether a first deferred clause is included in the first data definition statement, the first deferred clause allowing creation of the first database object with a dependency on the non-existing second database object by preventing a semantic analysis from being performed on the first data definition statement; the semantic analysis including validating a relationship between the first database object and the non-existing second database object; and
   based on the first deferred clause being included in the first data definition statement, creating the first database object with the dependency on the non-existing second database object without performing the semantic analysis of the first data definition statement;
   receiving a second data definition statement signaling modification of the first database object with the dependency on the non-existing second database object;
   detecting a second deferred clause in the second data definition statement; and
   based on the detecting of the second deferred clause in the second data definition statement, modifying the first database object in accordance with the second data definition statement.

8. The method of claim 7, wherein the first database object is initially in an invalid state, and wherein the modifying of the first database object results in the first database object remaining in the invalid state.

9. The method of claim 7, further comprising storing the first database object in a database.

10. The method of claim 7, wherein the first data definition statement is a data definition language (DLL) statement in standard query language (SQL).

11. The method of claim 7, wherein the first data definition statement is a create statement.

12. The method of claim 7, wherein the first database object is a view object, and wherein the non-existing database object is a data table.

13. A tangible machine-readable medium including instructions that, when executed by at least one processor of a machine, cause the machine to perform operations comprising:
   receiving a first data definition statement signaling creation of a first database object, the first data definition statement specifying a dependency of the first database object on a non-existing second database object, the first data definition statement including a first deferred clause that allows creation of the first database object with a dependency on the non-existing second database object by preventing a semantic analysis from being performed on the first data definition statement, the semantic analysis including validating a relationship between the first database object and the non-existing second database object;

detecting the first deferred clause in the first data definition statement;

based on the first deferred clause being detected in the first data definition statement, creating the first database object with the dependency on the second non-existing database object without performing the semantic analysis of the first data definition statement, the first database object being initially in an invalid state based on the dependency of the database object to a non-existing database object;

receiving a second data definition statement signaling modification of the first database object;

based on the second data definition statement including a second deferred clause, modifying the first database object in accordance with the second data definition statement, the first database object remaining in the invalid state as a result of the modifying; and storing the first database object in a database.

14. The tangible machine-readable medium of claim 13, wherein the first data definition statement is a data definition language (DDL) statement.

* * * * *